US009403295B2

(12) United States Patent
Sander

(10) Patent No.: US 9,403,295 B2
(45) Date of Patent: Aug. 2, 2016

(54) LOST-CORE MOLDED POLYMERIC GOLF CLUB HEAD

(71) Applicant: NIKE, Inc., Beaverton, OR (US)

(72) Inventor: Raymond J. Sander, Benbrook, TX (US)

(73) Assignee: Nike, Inc., Beaverton, OR (US)

( * ) Notice: Subject to any disclaimer, the term of this patent is extended or adjusted under 35 U.S.C. 154(b) by 30 days.

(21) Appl. No.: 14/264,109

(22) Filed: Apr. 29, 2014

(65) Prior Publication Data
US 2015/0038259 A1 Feb. 5, 2015

Related U.S. Application Data

(60) Provisional application No. 61/862,341, filed on Aug. 5, 2013.

(51) Int. Cl.
| | |
|---|---|
| *A63B 53/04* | (2015.01) |
| *B29C 33/76* | (2006.01) |
| *B29C 45/44* | (2006.01) |
| *B29K 101/00* | (2006.01) |
| *B29C 45/14* | (2006.01) |

(52) U.S. Cl.
CPC ............ *B29C 33/76* (2013.01); *A63B 53/0466* (2013.01); *B29C 45/4457* (2013.01); *A63B 2053/042* (2013.01); *A63B 2053/0416* (2013.01); *A63B 2053/0491* (2013.01); *B29C 45/14336* (2013.01); *B29K 2101/00* (2013.01)

(58) Field of Classification Search
CPC ................. A63B 53/0466; A63B 2053/042; A63B 2053/0416; A63B 2053/0491
USPC .......... 473/342, 343, 345, 346, 349, 335–339
See application file for complete search history.

(56) References Cited

U.S. PATENT DOCUMENTS

| | | | |
|---|---|---|---|
| 4,464,324 A | 8/1984 | Hager | |
| 4,472,092 A | 9/1984 | Schmidt | |
| 4,614,627 A | 9/1986 | Curtis et al. | |
| 4,883,623 A | 11/1989 | Nagamoto et al. | |
| 5,614,143 A | 3/1997 | Hager | |
| 6,050,904 A * | 4/2000 | Kuo | 473/342 |
| 6,146,571 A | 11/2000 | Vincent et al. | |
| 6,508,978 B1 | 1/2003 | Deshmukh | |
| 6,623,378 B2 | 9/2003 | Beach et al. | |
| 6,824,636 B2 | 11/2004 | Nelson et al. | |
| 2006/0240908 A1 | 10/2006 | Adams et al. | |
| 2011/0236699 A1 | 9/2011 | Heikkila | |

* cited by examiner

*Primary Examiner* — Benjamin Layno
(74) *Attorney, Agent, or Firm* — Quinn Law Group, PLLC

(57) ABSTRACT

A method of forming a golf club head includes forming a core of the golf club head from a material having a first melting temperature and affixing a club face to the core. The club face includes a first, hitting surface, a second surface that is opposite the first surface, and a locking feature. A body is then molded about the core and such that it surrounds at least a portion of the locking feature, the body formed from a polymeric material having a second melting temperature that is greater than the first melting temperature. Finally, the core is removed from within the body.

19 Claims, 7 Drawing Sheets

LOST-CORE MOLDED POLYMERIC GOLF CLUB HEAD

CROSS REFERENCE TO RELATED APPLICATIONS

This application claims the benefit of U.S. Provisional Application No. 61/862,341, filed Aug. 5, 2013, which is hereby incorporated by reference in its entirety.

TECHNICAL FIELD

The present invention relates generally to manufacturing techniques for forming a cavity in a golf club head through lost-core molding.

BACKGROUND

A golf club may generally include a club head disposed on the end of an elongate shaft. During play, the club head may be swung into contact with a stationary ball located on the ground in an effort to project the ball in an intended direction and with a desired vertical trajectory. This impact may generate momentary impact forces on the club face that can peak in the range of about 6520 N to about 18000 N (about 1520 lbf to about 4000 lbf).

Many design parameters must be considered when forming a golf club head. For example, the design must provide enough structural resilience to withstand repeated impact forces between the club and the ball, as well as between the club and the ground. The club head must conform to maximum size requirements set by different rule setting associations, and the face of the club must not have a coefficient of restitution above a predefined maximum (measured according to applicable standards). Assuming that certain predefined design constraints are satisfied, a club head design is typically quantified by the magnitude and location of the center of gravity, as well as the head's moment of inertia about the center of gravity and/or the shaft.

The club's moment of inertia relates to the club's resistance to rotation (particularly during an off-center hit), and is often perceived as the club's measure of "forgiveness." In typical driver designs, high moments of inertia are desired to reduce the club's tendency to push or fade a ball. Achieving a high moment of inertia generally involves placing mass as close to the perimeter of the club as possible (to maximize the moment of inertia about the center of gravity), and as close to the toe as possible (to maximize the moment of inertia about the shaft).

While the moment of inertia affects the forgiveness of a club head, the location of the center of gravity behind the club face (and above the sole) generally affects the trajectory of a shot for a given face loft angle. A center of gravity that is positioned as far rearward (away from the face) and as low (close to the sole) as possible typically results in a ball flight that has a higher trajectory than a club head with a center of gravity placed more forward and/or higher.

While a high moment of inertia is obtained by increasing the perimeter weighting of the club head, an increase in the total mass/swing weight of the club head (i.e., the magnitude of the center of gravity) has a strong, negative effect on club head speed and hitting distance. Said another way, to maximize club head speed (and hitting distance), a lower total mass is desired; however a lower total mass generally reduces the club head's moment of inertia (and forgiveness).

In the tension between swing speed (mass) and forgiveness (moment of inertia), it may be desirable to place varying amounts of mass in specific locations throughout the club head to tailor a club's performance to a particular golfer or ability level. In this manner, the total club head mass may generally be categorized into two categories: structural mass and discretionary mass.

Structural mass generally refers to the mass of the materials that are required to provide the club head with the structural resilience needed to withstand repeated impacts. Structural mass is highly design-dependant, and provides a designer with a relatively low amount of control over specific mass distribution. On the other hand, discretionary mass is any additional mass that may be added to the club head design for the sole purpose of customizing the performance and/or forgiveness of the club. In an ideal club design, the amount of structural mass would be minimized (without sacrificing resiliency) to provide a designer with a greater ability to customize club performance, while maintaining a swing weight that is expected by the consumer.

In the interest of minimizing the total structural mass, most metal woods, for example, generally employ a thin metal face and hollow structural shell formed from a high strength, lightweight metal alloy. Such a design, while effective in reducing structural mass, may involve complex, multi-stage manufacturing processes, and may be limited in further advancements due to the cost prohibitive nature of more advanced alloys.

Another design factor involves the type of face style that is chosen for the club. In metal woods, the majority of designs can be categorized as either cup-faced, or edge-welded. An edge-welded design typically involves a substantially planar metallic plate that is fused onto the forward, face portion of the club to form the hitting surface. This plate is typically inlaid into a slight recess, and welded or fused to the body at, or proximate to the edge of the plate.

A cup-faced design includes a similar metallic plate/hitting surface, however, the plate extends beyond just the forward, face portion and onto the sole/skirt/crown of the body. Such a design extends the weld-line rearward, behind the hitting surface. In this manner, the cup-face design can provide a slightly larger possible hitting surface, and reduces the possibility for a welded edge, or portion of the body, to be directly impacted by the ball.

SUMMARY

A method of forming a golf club head includes forming a core of the golf club head from a material having a first melting temperature and affixing a club face to the core. The club face includes a first, hitting surface, a second surface that is opposite the first surface, and a locking feature. A body is then molded about the core and such that it surrounds at least a portion of the locking feature, the body formed from a polymeric material having a second melting temperature that is greater than the first melting temperature. Finally, the core is removed from within the body, such as by melting or dissolving.

In one configuration, the locking feature that is used to secure the face to the body includes a flange. The flange may be generally parallel to a portion of the first, hitting surface (i.e., to within about 30 degrees), and may be separated from the second surface by a distance. Molding a body such that it surrounds at least a portion of the locking feature may therefore include molding the body such that the polymeric material flows to opposing sides of the flange. This may provide a mechanical interference between the body and the club face, which inhibits all relative translation between the club face and the body. In one configuration, the molding may be performed through an injection molding process, such as by positioning the core and club face within a mold, and injection molding a polymeric material between the mold and the core.

In an embodiment, a golf club head assembly may include a core, a club face, and a polymeric body. The core may be formed from a first material and having a first melting temperature. The club face may be affixed to the core and may include a first, hitting surface, a second surface that is opposite the first surface, and a flange that is separated from the second surface by a transverse distance that is greater than zero.

The polymeric body is disposed about the core and on opposing sides of the flange. The polymeric body has a second melting temperature that is greater than the first melting temperature. The core is configured to be removed from the polymeric body by heating the core to a temperature between the first melting temperature and the second melting temperature, or by using a solvent.

The flange is parallel to a portion of the first surface to within about +/−30 degrees, and the polymeric body disposed on opposing sides of the flange provides a mechanical interference between the body and the club face to inhibit all relative translation between the club face and the body. In one configuration, the flange is a single, continuous flange that is aligned with a circumference of at least one of the first surface and the second surface.

DETAILED DESCRIPTION

Figure 1:
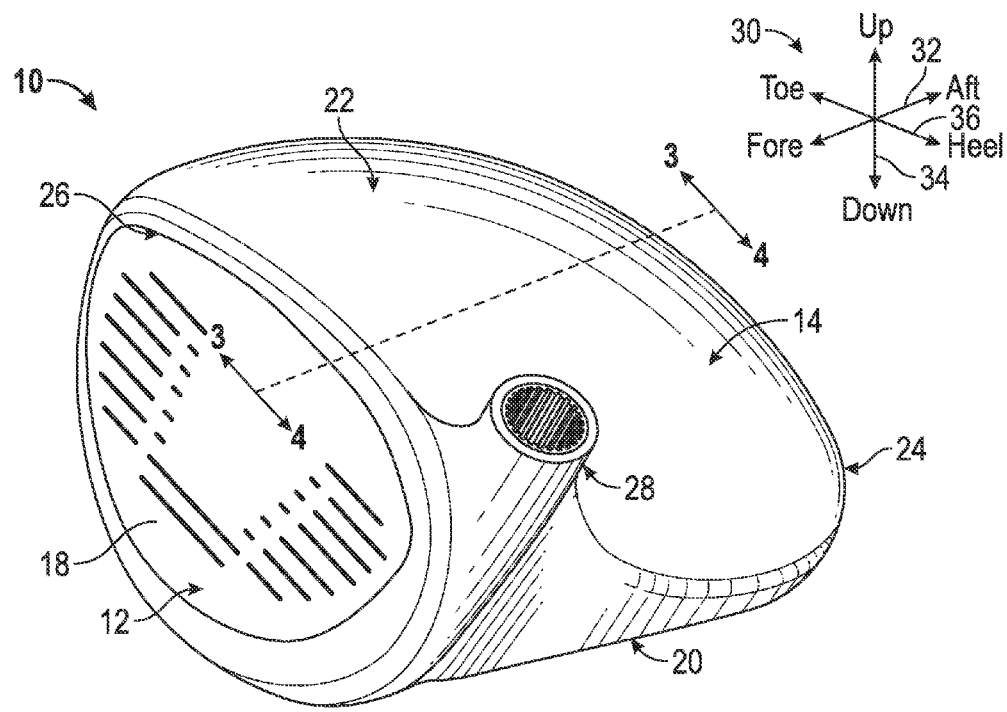
FIG. 1 is a schematic perspective view of a golf club head.
Figure 2:
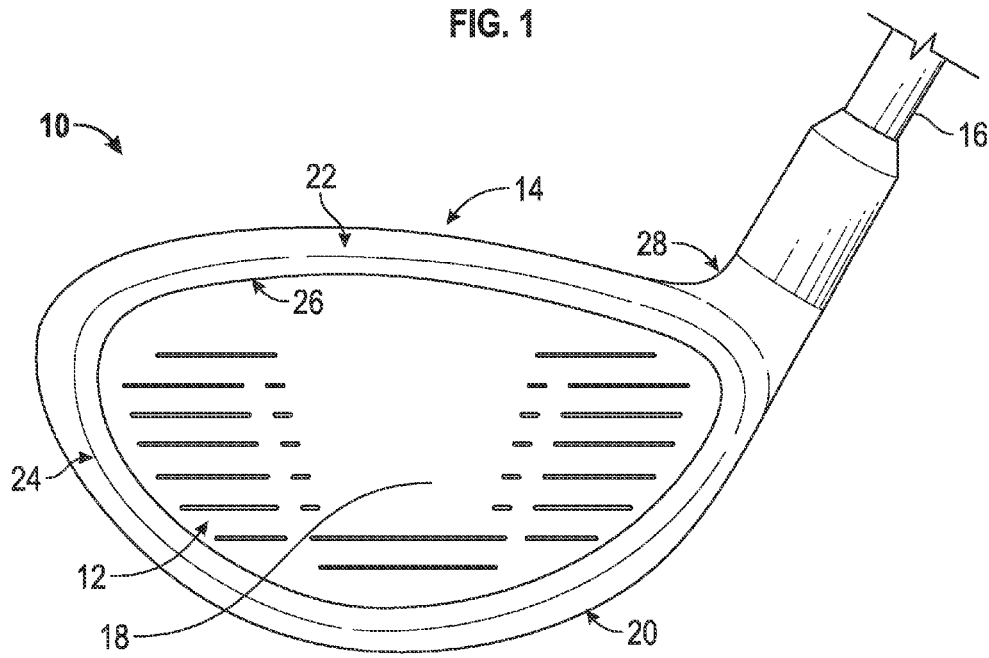
FIG. 2 is a schematic front view of a golf club head.

Referring to the drawings, wherein like reference numerals are used to identify like or identical components in the various views, FIG. 1 schematically illustrates a schematic perspective view of a wood-type golf club head 10 (i.e., "club head 10") that generally includes a face portion 12 (i.e., the "face 12") and a body portion 14 (i.e., the "body 14"). As generally illustrated in FIG. 2, the club head 10 may be mounted on the end of an elongate shaft 16, which may, in turn, be gripped and swung by a user to impart a generally arcuate motion to the club head 10 during a typical swing.

The face 12 of the club head 10 may generally define a hitting surface 18 that is intended to contact a golf ball during a normal swing. The hitting surface 18 may be a planar surface, or may have a slight convex/arcuate curvature that extends out from the club head 10. Additionally, as is commonly understood, the hitting surface 18 may be disposed at an angle to a vertical plane when the club is held in a neutral hitting position. This angle may be generally referred to as the loft angle or slope of the club. Wood-type club heads (including hybrid woods) may most commonly have a loft angle of from about 8.5 degrees to about 24 degrees, though other loft angles are possible and have been commercially sold.

The body 14 of the club head 10 may generally be configured to support the face 12 and to provide a connection means between the face 12 and the elongate shaft 16. Referring again to FIG. 1, the body 14 may generally include a lower portion 20 (i.e., a "sole 20"), an upper portion 22 (i.e., a "crown 22"), a side portion 24 that generally couples the sole 20 with the crown 22 (i.e., a "skirt 24"), and a hosel 28 that is configured to receive and/or otherwise couple with the elongate shaft 16. In an edge-welded-style club head, the body may further include a forward-facing wall 26 that at least partially abuts the face 12. Axes 30 further define directionally-related portions of the club head 10, including a fore-aft axis 32 extending through the face 12 (generally indicating front and rear portions/directions of the club head 10), a vertical axis 34 extending perpendicular to the fore-aft axis 32 and between the sole 20 and crown 22, and a toe-heel axis 36 extending perpendicular to both the fore-aft axis 32 and the vertical axis 34.

Figure 3:
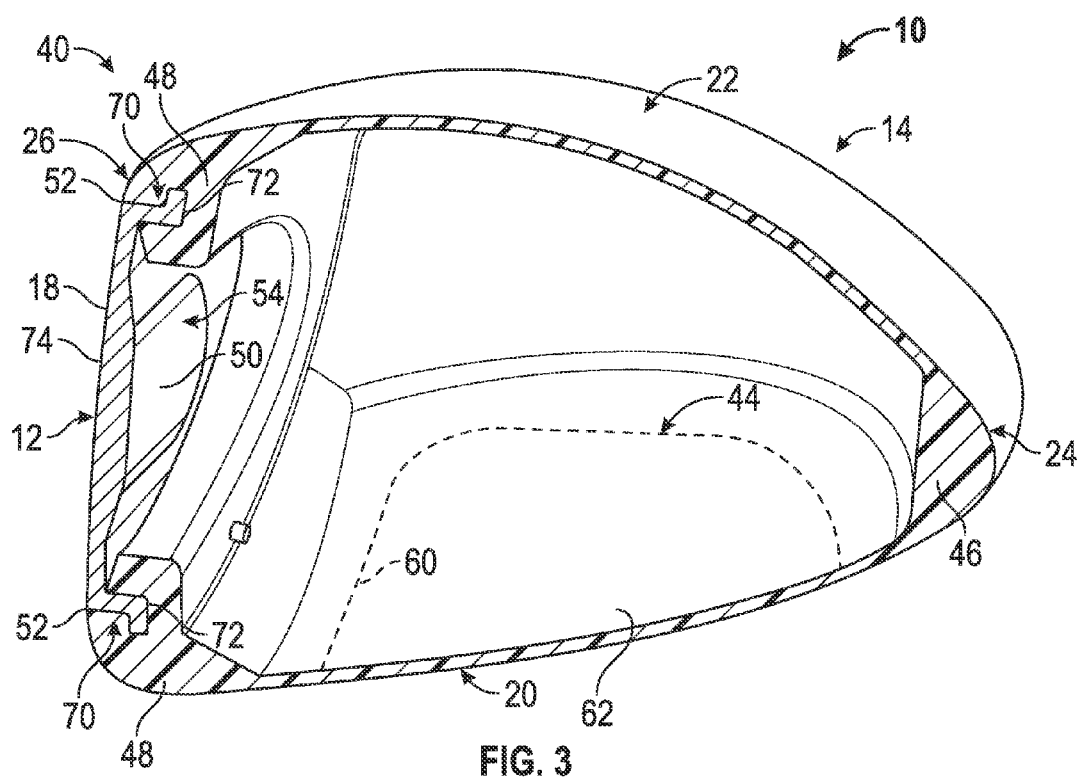
FIG. 3 is a schematic cross-sectional view of the golf club head provided in FIG. 1, taken along line 3-3.
Figure 4:
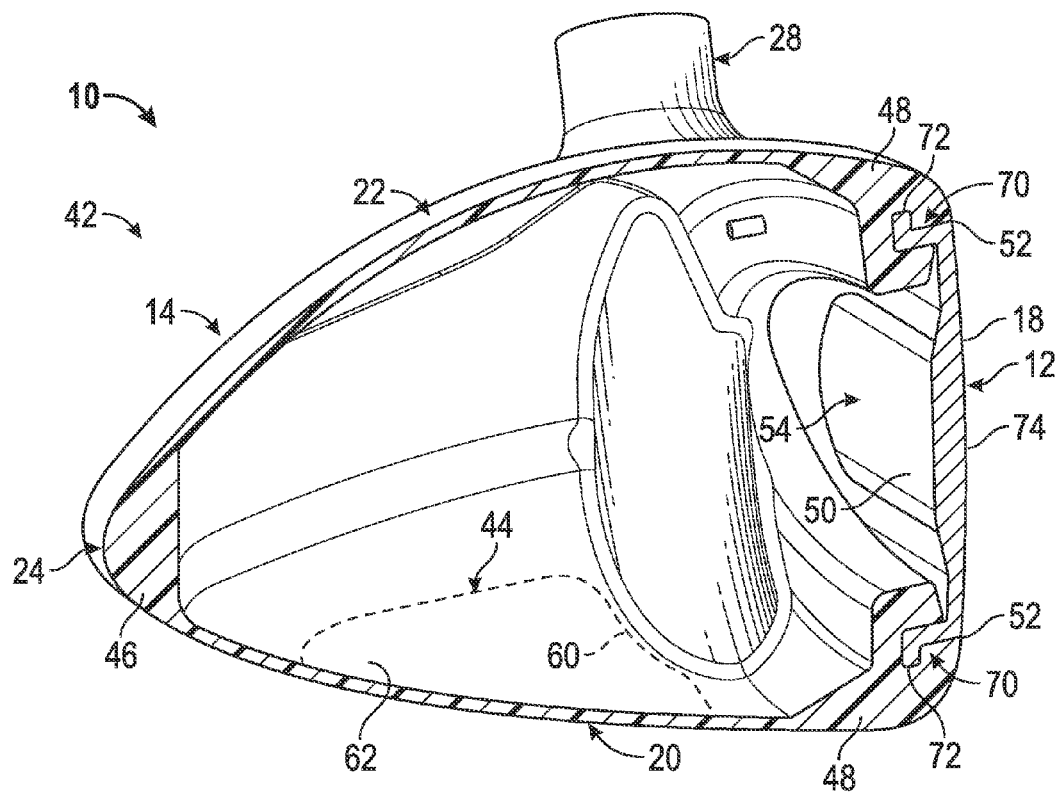
FIG. 4 is a schematic cross-sectional view of the golf club head provided in FIG. 1, taken along line 4-4.

FIGS. 3 and 4 generally illustrate schematic cross-sectional views 40, 42 taken along a vertical, fore-aft plane and respectively facing in opposite directions (i.e., FIG. 3 is generally toe-facing, and FIG. 4 is generally heel-facing). As shown, the body 14 may at least partially surround and/or define an internal volume/cavity 44 that may be filled with air. While FIGS. 3 and 4 illustrate the cavity 44 as being a closed cavity (i.e., isolated from the external environment), in other embodiments the cavity 44 may be partially open, such as by removing a portion of one or both of the crown 22 and sole 20.

The views 40, 42 provided in FIGS. 3 and 4 further illustrate the thin-walled nature of the crown 22 and sole 20, and provide further illustration of the portion generally referred to as the skirt 24. In one configuration, the skirt 24 may include and/or be defined by a band of thicker material 46 disposed about the perimeter of the body 14 and between the crown 22 and the sole 20. This band of material 46 may serve a structural function by reinforcing the outward edge of the body 14 against impacts, though may also be varied throughout the skirt 24 to increase the moments of inertia and/or alter the center of gravity.

The face 12 may generally be formed from a metal or metal alloy, and may be structurally supported on the body 14 by a face support 48. The face support 48 may be an integrated portion of the body 14 and may generally receive a load/stress from the face 12 during an impact. The face support 48 may be operative to transmit this received load/stress to the remainder of the body 14 where it may be dissipated and/or absorbed. The face support 46 may be slightly recessed behind the face 12 and/or forward-facing wall 26, and may contact a rear-facing surface 50 of the face 12 that is opposite the hitting surface 18. In one configuration, the face support 48 may generally be disposed proximate to the perimeter 52 of the face 12, and may define an open central region 54 where the rear-facing surface 50 of the face 12 is exposed to the cavity 44. Additionally, as generally illustrated in FIG. 3, the face support 48 may have an angled nature (i.e., where the rear-facing surface 50 of the face 12 may contact the support 48) to permit some amount of face-flexure prior to the face making flush contact with the support 48 (i.e., to promote a limited "trampoline-like effect").

To reduce structural mass beyond what is economically viable with metal alloys, the body 14 of the club head 10 may be formed from a polymeric material having a yield strength that is great enough to withstand the repeated stress imparted by the ball impact. Examples of such materials may include certain polyamides, polyimides, polyamide-imides, polyetheretherketones (PEEK), polycarbonates, engineering polyurethanes, and/or other similar materials. In general, the polymeric material may be a either thermoplastic or thermoset, and may be unfilled, glass fiber filled, carbon fiber filled, or may have other suitable fillers and/or additives to promote increased strength. In one configuration, a suitable material may have a tensile strength of at least about 180 MPa, while in other configurations it may have a tensile strength of at least about 220 MPa.

In one configuration, the entire polymeric body 14 may be formed as a single, continuous piece. Such a design may have strength benefits by reducing seams, weld lines, or other parting lines that may act as stress concentration points. In another configuration, the design of the body 14 may include a single seam 60 located within the sole 20, where a sole plate 62 may be subsequently bonded/fused to the body 14 to form a closed cavity 44 (if desired). As discussed above, however, in some designs, this sole plate 62 may be omitted to provide an open-cavity club head 10. While reducing seam lines may provide certain structural and manufacturing advantages, the previous examples are intended to be illustrative, and should not exclude other designs that have two or more seams.

To provide a rigid connection between the face 12 and the face support 48, the face 12 may include one or more mechanical locking features 70 disposed about its perimeter 52 that are configured to interlock with a portion of the body 14. In one configuration, the locking feature may include a flange 72 that extends from the rear-facing surface 50 of the face 12 and may be embedded within the face support 48 during the fabrication of the body 14. For example, the polymer used to form the body 14 may be over-molded around the flange 72, such that the polymer contacts and surrounds the flange 72 up to, for example, the rear-facing surface 50 of the face 12. Once the polymer has solidified, it may firmly secure the flange within the face support 48, and interfere with the flange's ability to withdraw from the support 48.

In addition to providing a rigid coupling means, the overmolded flange 72 may also efficiently transfer forces between the face 12 and the body 14. More specifically, the geometry of the flange 72 may increase the contact area between the face 12 and the body 14 (thus lowering contact pressures). Additionally, the molding process may provide uniform contact between the flange 72 and face support 48 across the entire surface area of the flange 72. Such a design may promote a more uniform force transfer than a club head with an affixed face inlay that may only make firm contact at a plurality of discrete points.

Figure 5:
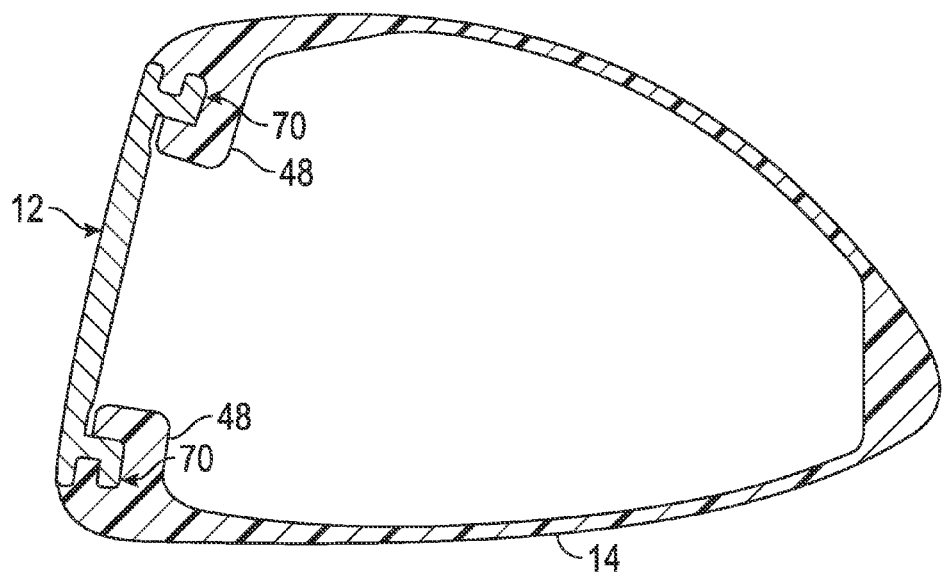
FIG. 5 is a schematic cross-sectional view of an embodiment of a golf club head.
Figure 6:
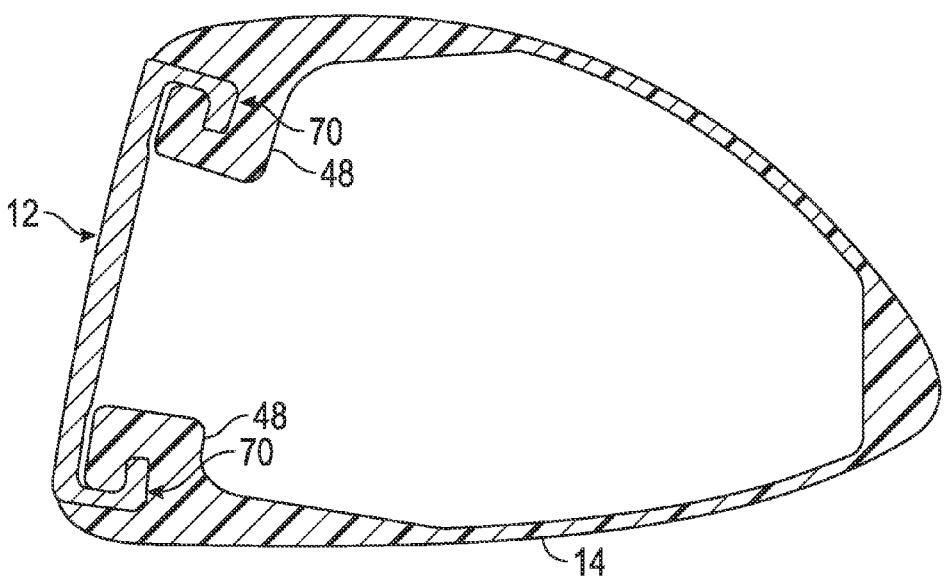
FIG. 6 is a schematic cross-sectional view of an embodiment of a golf club head.
Figure 7:
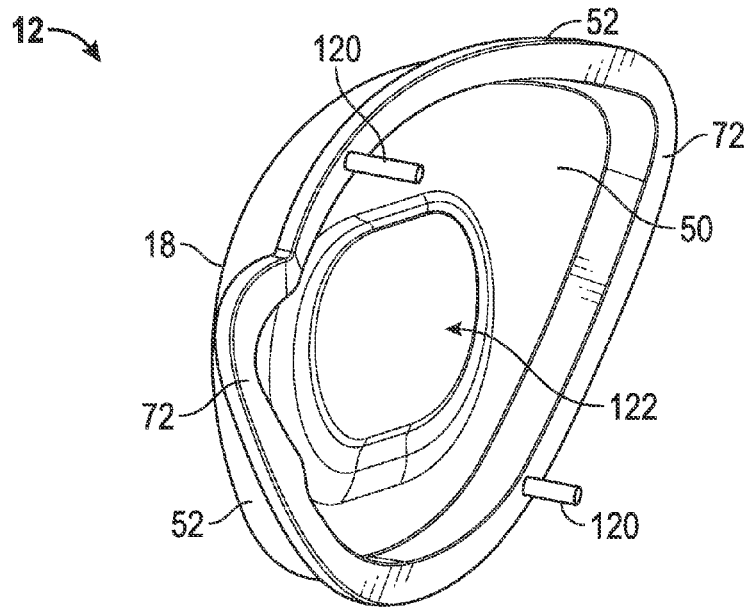
FIG. 7 is a schematic perspective view of a rear-portion of a face portion of a golf club head.

While suitable flanges may include a variety of shapes and sizes, the example illustrated in FIGS. 3 and 4 is generally an "L"-shaped flange 72 that includes a first portion extending from the rear-facing surface 50 of the face 12 in direction that is generally perpendicular to the surface 50, and a second portion extending radially outward from the first portion. FIGS. 5-6 generally illustrate other flange configurations that may be used to mechanically retain the face 12 within the club body 14. These examples include a dual-flange design (FIG. 5) and a radially inward facing "L" flange design (FIG. 6). Still other configurations may include hooks, tabs, angled posts, or other such protrusions that may likewise mechanically interlock with the body 14. The face 12 may generally include either a plurality of discrete locking features 70 disposed around its perimeter 52 at spaced intervals, or may include a single continuous flange 72 that extends around the entire perimeter 52, such as shown in FIG. 7.

Common to all of the above-described designs is a flange 72 extending in a direction that is generally parallel to the face 12, while being separated from the face 12 by a distance. By "generally parallel," it is intended that the flange 72 be parallel to the hitting surface 18 to within about +/−30 degrees. Such a design allows the polymer of the body 14 to flow between the flange 72 and the rear-facing surface 50 of the face 12 to form a mechanical interlock that prevents the face 12 from freely withdrawing from the body 14. The flange 72 is connected to the remainder of the face 12 through an extension member that spans the distance between the rear-facing surface 50 of the face 12 and the flange 72. In an edge-welded-style face, this extension member may be entirely surrounded by polymer (as shown in FIGS. 3-6). In a cup-faced design, the extension member may form an outer surface of the club head 10. Regardless of the design, the hitting surface 18, extension member, and flange 72 may have a similar material construction and/or may be formed from a single material.

Figure 8:
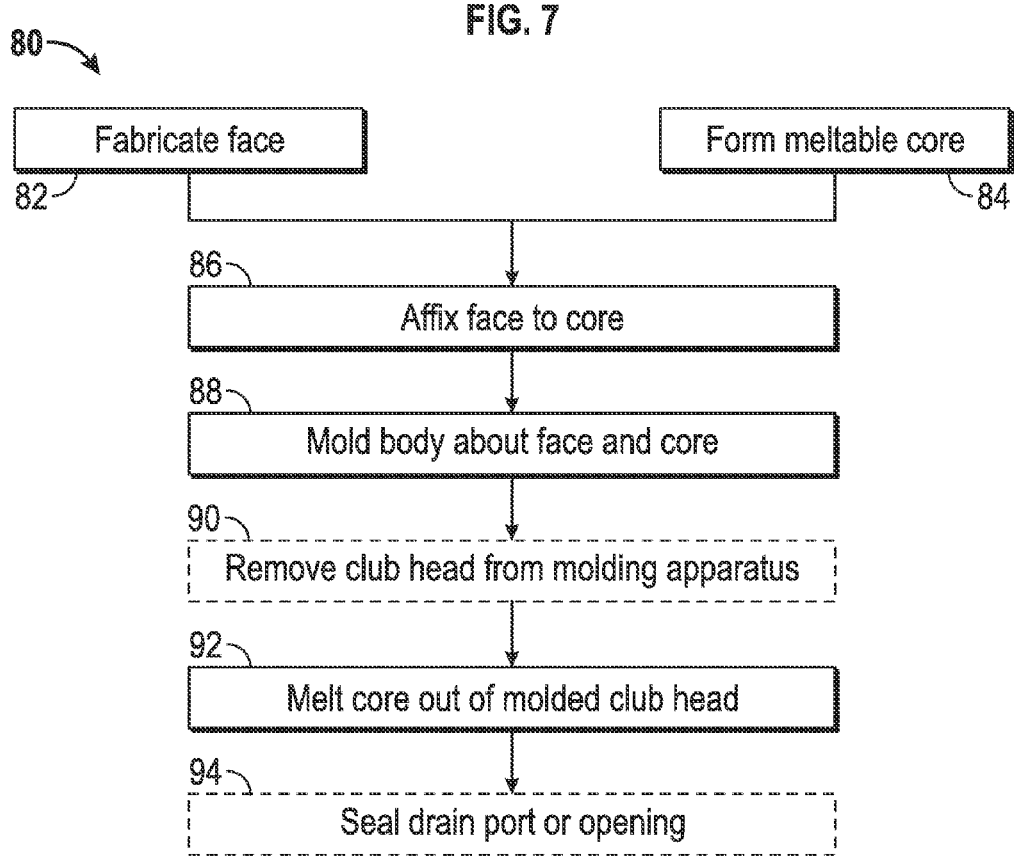
FIG. 8 is a schematic flow diagram of a method of manufacturing a golf club head using a lost-core molding technique.

As discussed above, the present club head 10 may be fabricated by molding a high tensile strength polymer material into the shape of the club body 14, while ensuring that the polymer material also over-molds certain retaining features of a metallic face 12. FIG. 8 generally illustrates a manufacturing method 80 that may be used to fabricate a club head 10 of the current design. The method 80 may generally employ a molding technique known as "lost-core molding" to create the substantially hollow body geometry and face-interlock. Lost-core molding typically involves creating a core mold from a material having either a low melting temperature (e.g., from about 120° C. to about 200° C.) or a high solubility, over-molding the core with a polymeric material having a compatible melting temperature (or solubility), allowing the polymeric material to cool and (if thermoplastic) solidify, and subsequently melting or dissolving out the core so that only the molded polymeric part remains. This process permits complex internal geometries to be formed during a seamless, single molding operation (as opposed to forming the body in multiple discrete sections and attempting to bond/fuse them together).

With continued reference to FIG. 8, the manufacturing method 80 begins at 82 with the production of the face 12. The face 12 may generally be formed from a light-weight metal alloy that may be either cast (e.g., through an investment casting process) or forged into the proper shape. Non-limiting examples of suitable face materials may include stainless steel (e.g., AISI type 304 or AISI type 630 stainless steel) or titanium (e.g., Ti-6Al-4V Titanium alloy), however other metal alloys, metal amorphous alloys, and/or non-metallic materials known in the art may similarly be used (for example, and without limitation, high-strength polymers or metal-polymer laminates).

Figure 9:
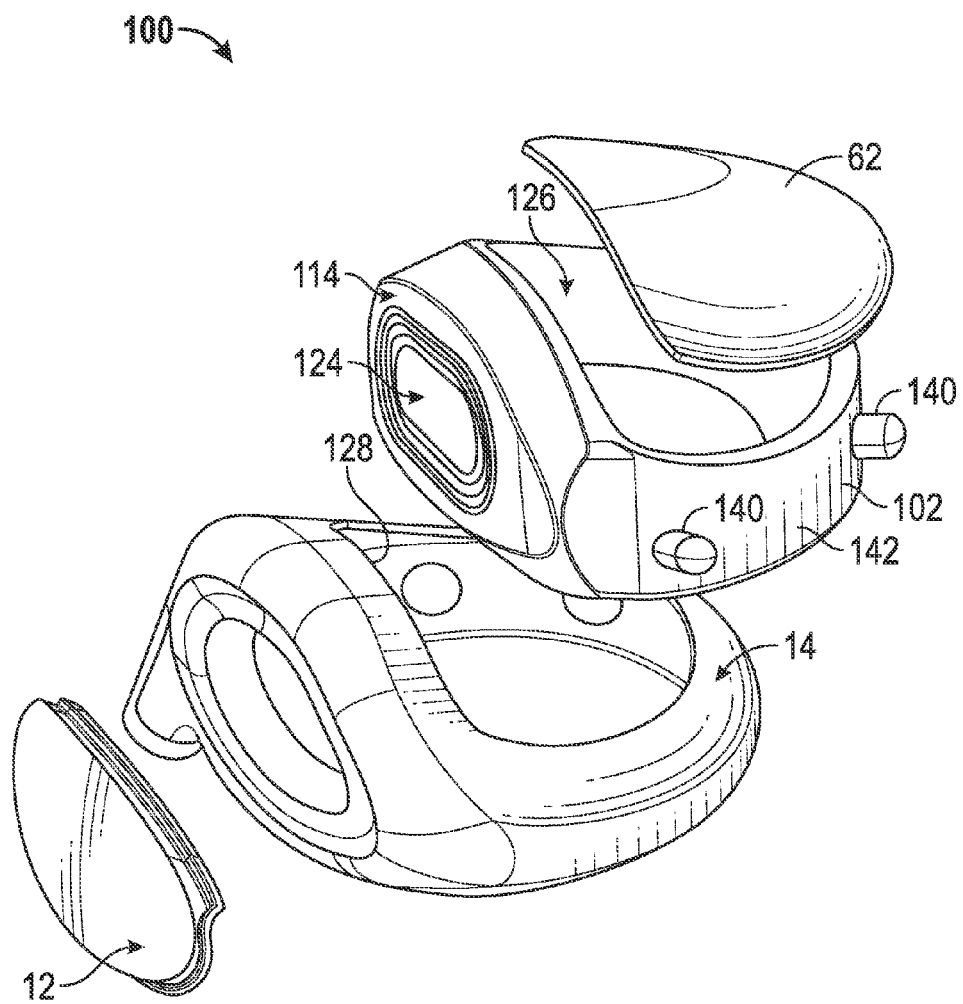
FIG. 9 is a schematic exploded perspective view of a golf club head and a meltable core.

In a separate process, a meltable core may be formed at 84 to generally resemble the internal cavity 44 of the club head 10. FIG. 9 generally illustrates an exploded view 100 of a club head 10, with one embodiment of a meltable core 102 illustrated above the body 14. Such a core 102 may be composed of a polymeric material that may be soluble in water, acetone, or another known or specially tailored solvent. Alternatively, the core 102 may be composed of a metal alloy having a relatively low melting temperature. Examples of typical low-melting temperature alloys include various compositions of bismuth, tin, lead, and zinc. The core 102 may be formed into a desired shape using typical fabrication methods, such as for example, casting, machining, or injection molding, or combinations thereof.

Figure 10:
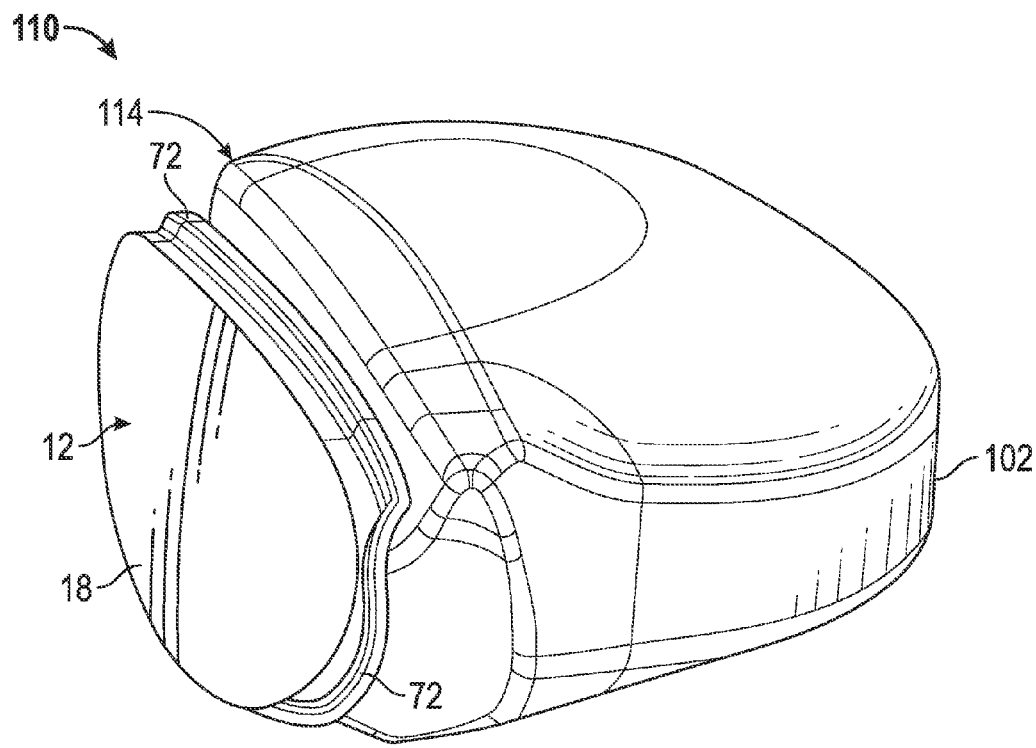
FIG. 10 is a schematic perspective view of a face portion of a golf club head affixed to a meltable core.
Figure 11:
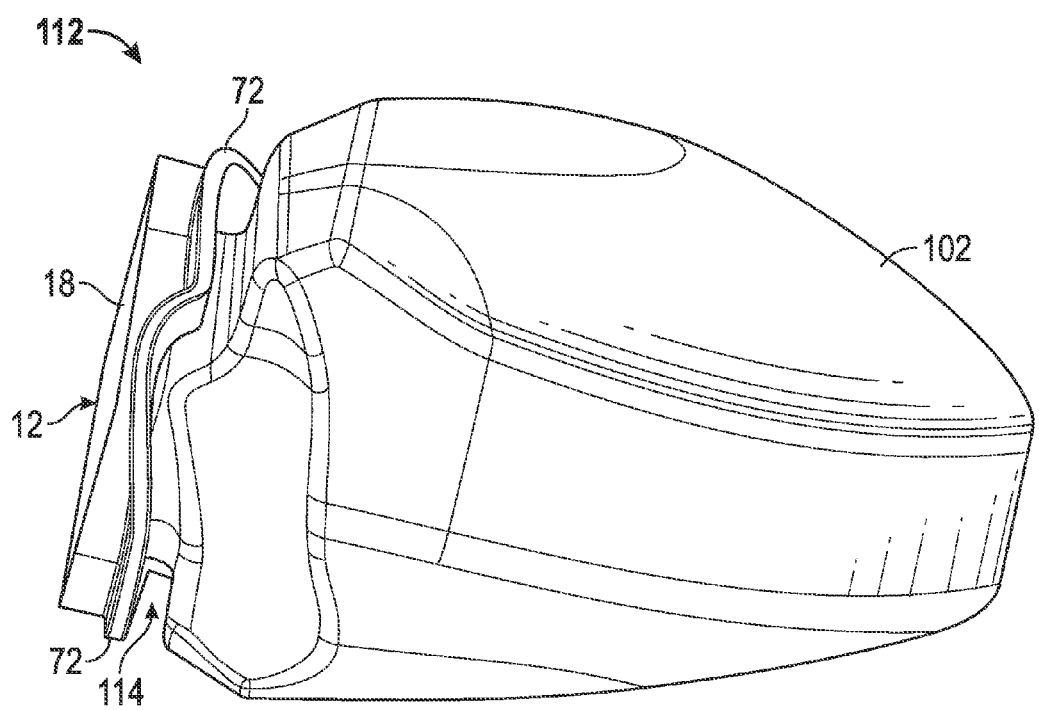
FIG. 11 is a schematic side view of a face portion of a golf club head affixed to a meltable core.
Figure 12:
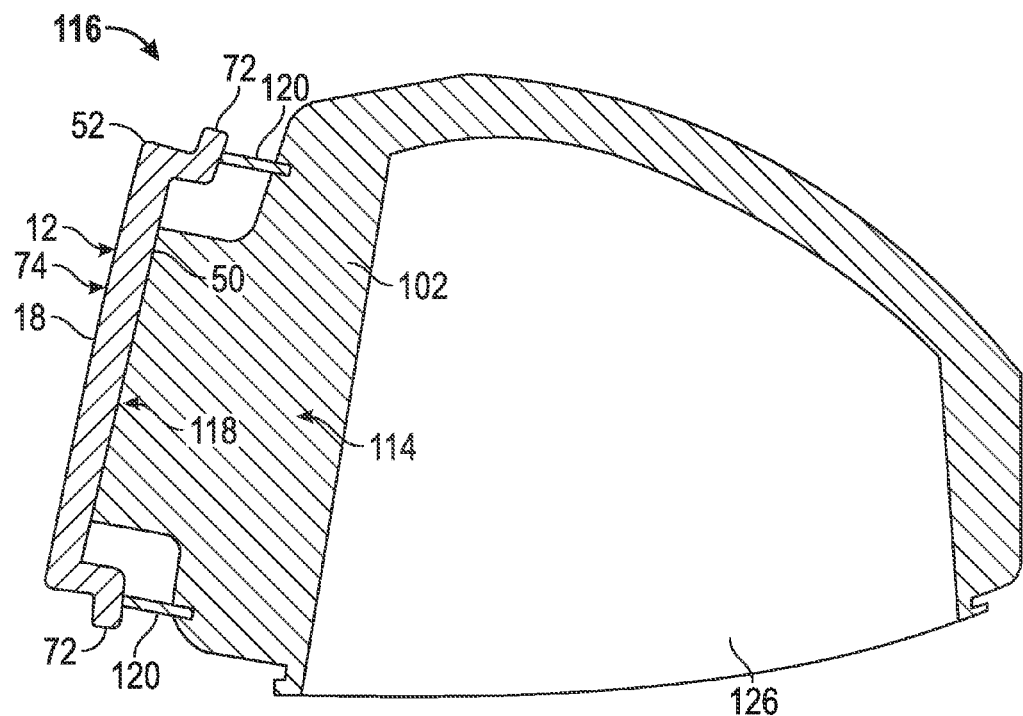
FIG. 12 is a schematic cross-sectional view of a face portion of a golf club head affixed to a meltable core.
Figure 13:
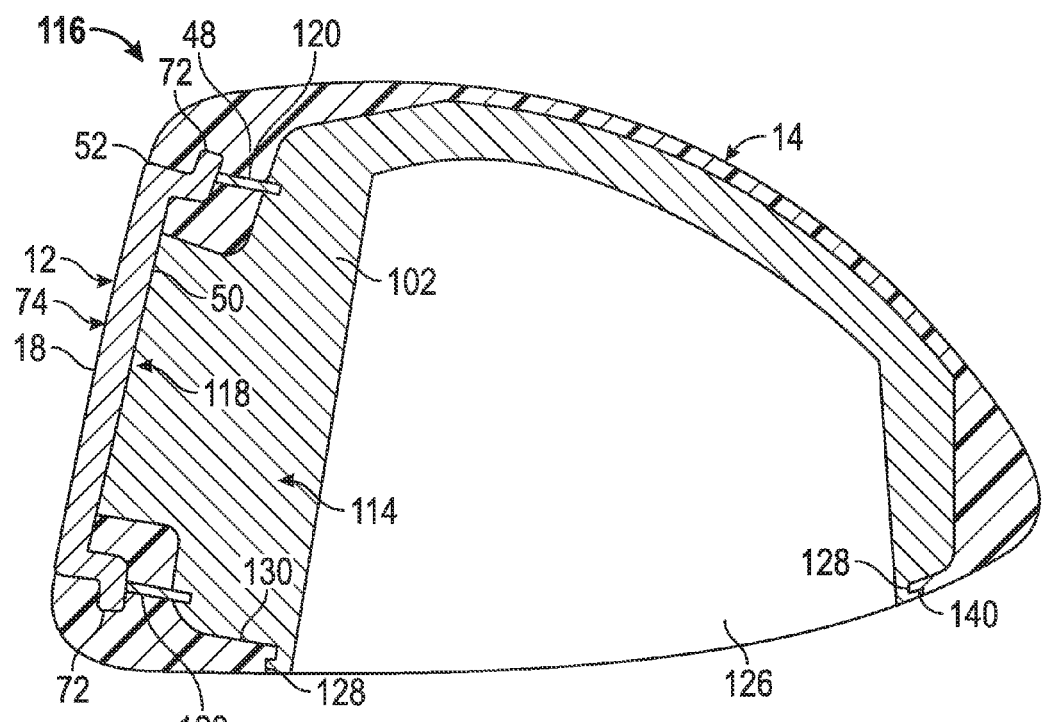
FIG. 13 is a schematic cross-sectional view of a face portion of an intermediate golf club head assembly having a face, a meltable core, and an over-molded polymer disposed about a portion of the face and a portion of the core.

Referring again to FIG. 8, at 86 the face 12 may be affixed to the meltable or dissolvable core 102. FIGS. 10 and 11 respectively illustrate a top perspective view 110 and a side view 112 of a meltable core 102 having a face 12 affixed to a front portion 114 of the core 102. Additionally, FIGS. 12 and 13 illustrate a schematic cross-sectional view 116 of the face 12 and core 102, taken along a vertical, fore-aft plane. In general, FIG. 12 illustrates the face 12 affixed to the core 102 prior to an over-molding, and FIG. 13 illustrates the same assembly with the body 14 molded in place (i.e., an intermediate golf club head assembly).

As generally illustrated in each of FIGS. 10-13, in one configuration, the flange 72 may extend in a radially outward direction from a central portion 74 of the face 12. As best illustrated in FIGS. 12-13, in one configuration, the core 102 may contact the rear-facing surface 50 of the face 12 only in a central area 118 that will form the open central region 54 where the rear-facing surface 50 of the face 12 is exposed to the cavity 44. As such, the core 102 may be separated from the flange 72 by an amount that is sufficient to provide a properly dimensioned face support 48 that is capable of supporting the face 12 and transferring the repetitive impact loads from the face 12 to the body 14.

The face 12 may be affixed to the core 102 using any suitable means of temporary attachment. Ultimately, the temporary attachment may allow the face 12 and core 102 to maintain a proper relative position and alignment when being positioned in a molding cavity to receive the over-mold. In one configuration, the attachment means may include a plurality of locating pins 120 that may extend from the face 12 into corresponding locating holes provided in the core 102. FIG. 7 generally illustrates one embodiment of such locating pins 120 that may extend from a portion of the flange 72. These pins 120 may be cast in place, or may be joined to the face 12 through a separate process. FIGS. 12 and 13 generally illustrate the use of locating pins 120 to affix the face to the core 102.

In another configuration, similar locating pins may extend out from the hitting surface 18 of the face 12. Instead of extending into locating holes within the core 102, the locating pins 120 may be used to properly position the face 12 within a molding die. For the purpose of this description, holding the face 12 and core 102 in direct, adjoining contact, through an intermediate body, such as the mold, is one manner of "affixing," as used herein. Once the body 14 is over-molded onto the core, the hitting surface 18 may be machined to remove the locating pins.

In still another configuration, the face 12 may be positioned on the core 102 using one or more locating features, such as unique surface contours, embossings, indexing protrusions or other similar features, which may ensure that the face 12 is properly positioned and oriented relative to the core 102. Referring again to FIG. 7, in one embodiment, the rear-facing surface 50 of the face may have a structural reinforcing portion 122 in relief, which may extend outward from the face 12 to provide a locally increased face thickness. As generally illustrated in FIG. 9, the core 102 may include a similar, though inverse relief pattern 124 configured to receive the structural reinforcing portion 122 of the face 12. Prior to over-molding, the structural reinforcing portion 122 or other localizing features of the face 12 may be mated with the inverse features 124 on the core 102. In another embodiment, a temporary and/or soluble adhesive may be used to adhere the face 12 to the core 102, with the locating features used as an alignment guide.

Referring again to FIG. 8, once the face 12 is affixed to the core 102 in step 86, the polymeric club head body 14 may be molded about the face/core assembly at 88. In general, any traditional molding techniques may be used, however injection molding may be the most straightforward process. During the injection molding process, two or more molding dies may surround the face/core assembly to form a molding cavity. A suitable molten polymer may be injected into the mold cavity, between the molding dies and the core 102, to form the club-head body 14. The result of this molding process is generally illustrated in FIG. 13. In general, the injected polymer may have a higher melting temperature, and may be injected at a higher temperature than the melting temperature of the core 102. As such, precautions may need to be taken to guard against deformation and/or melting of the core during the molding process. Such precautions may include, for example, pre-cooling the core 102 prior to molding and/or actively cooling the core 102 during the injection of the molten polymer. While injection molding is one manner to over-mold the body onto the face/core assembly, in other configurations different molding processes may be used, such as for example, compression molding or dip coating.

Referring again to FIG. 8, once the body 14 of the club head 10 is over-molded onto the face/core assembly at 88, the combined club head 10/core assembly may be removed from the molding dies at 90. At this point, the meltable core 102 may be removed from the assembly at 92 by heating the core 102 above its melting temperature, and allowing the molten core to flow out of the cavity 44 through one or more drain ports or open portions provided in the sole 20. The process of removing the core 102 may be a controlled process that is careful not to melt or deform the newly formed body 14. The core removal process may involve one or more fluid immersion baths, solvents that may act only on the core, focused induction heating, autoclave/oven heating, or other processes that may be known in the art. Alternatively, in some techniques, step 90 may be omitted and the core-removal process may occur directly within the mold.

As generally shown in FIGS. 9, 12, and 13, in one configuration, the core 102 may define one or more internal voids 126 that may be strategically placed to accelerate the core-removal process. By removing material from the core 102 that is not structurally required during the injection molding process, a smaller quantity of material may then need to be heated and removed from the club head 10. As shown in FIG. 13, in one configuration, the void 126 in the core 102 may align with a corresponding opening 128 in the sole 20. While this opening 128 in the sole 20 may provide an adequate drain port through which the molten core may be removed, it may also permit the core 102 to be internally fixed/fixtured within the molding cavity during the molding process. Such a configuration may eliminate the need for various suspension pegs that may otherwise be required to properly locate the core 102 within the molding cavity.

Referring again to FIG. 8, once the core 102 has been removed from the club head 10 (at 92), the drain port or opening 128 may be (optionally) covered at 94, such as using a plug or sole plate 62. As generally illustrated in FIG. 13, in one configuration, a recessed shelf 130 may be molded into the body 14 to receive the sole plate 62 (the sole plate 62 generally being illustrated in the exploded view provided in FIG. 9). Using the recessed shelf 130, the sole plate 62 may be maintained in an externally flush arrangement with the remainder of the body 14 where it may then be bonded, adhered, fused, welded or otherwise mechanically attached to the body 14.

As mentioned above, the lost-core manufacturing technique may permit unique geometries to be internally molded into a generally seam-free polymeric club head 10, which may not have been possible through more traditional club manufacturing techniques. For example, internal ribs, gussets and buttresses can be placed into the core to mold such features into the head. Likewise, as generally illustrated in FIG. 9, the core may be formed to have one or more protrusions 140 extending radially outward from a skirt portion 142. In the finally manufactured club head 10, these protrusions 140 may form specifically located voids in the body 14 that may receive weight inserts (i.e., discretionary mass) to alter the center of gravity and moments of inertia of the head 10. In another embodiment, the aforementioned weight inserts may be mechanically adhered directly to the core 102 (in lieu of the protrusions 140), where they may be molded in place once the core 102 is removed. In one configuration, these molded-in-place weights may have a particular geometry or retaining features that may prohibit their withdrawal from the body 14. In still other embodiments, a continuous (yet variable) weight band may extend around the skirt portion 142 of the core 102, where the weight band may be integrally molded into the body 14 following the removal of the core 102. In each instance, the use of the present manufacturing techniques with high strength polymers may enable great flexibility in the design and discretionary weighting of club heads.

While the present description has focused on wood-type clubs having a single cavity 44, in other embodiments, club heads with multiple cavities may also be formed through this method 80. For example, in one configuration, a club head 10 may include a first, forward-located cavity that is substantially closed or isolated from the surrounding environment, and a second, rearward-located cavity that may be an "open" cavity, though may be isolated from the first cavity by a divider wall. In other embodiments, the size and dimension of various cavities and/or the position of various cavity dividers may be easily altered by merely creating a new core design.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. In this description of the invention, for convenience, "polymer" and "resin" are used interchangeably to encompass resins, oligomers, and polymers. The terms "comprises," "comprising," "including," and "having," are inclusive and therefore specify the presence of stated items, but do not preclude the presence of other items. As used in this specification, the term "or" includes any and all combinations of one or more of the listed items. In other words, "or" means "and/or." When the terms first, second, third, etc. are used to differentiate various items from each other, these designations are merely for convenience and do not limit the items.

What is claimed is:

1. A method of forming a golf club head comprising:
    forming a core of the golf club head from a material having a first melting temperature;
    affixing a club face to the core, the club face including a first, hitting surface, a second surface that is opposite the first surface, and a locking feature wherein the club face is affixed to the core such that a portion of the second surface is in flush contact with a surface of the core and such that the locking feature is spaced apart from the core;
    molding a body about the core and such that it surrounds at least a portion of the locking feature, the body formed from a polymeric material having a second melting temperature that is greater than the first melting temperature;
    removing the core from within the body by:
        melting the core; and
        draining the molten core from the body;
    wherein the locking feature includes a flange that is parallel to a portion of the first surface to within about +/−30 degrees and separated from the second surface by a transverse distance that is greater than zero; and
    wherein molding a body such that it surrounds at least a portion of the locking feature includes molding the body such that the polymeric material flows to opposing sides of the flange.

2. The method of claim 1, wherein molding a body about the core includes:
    positioning the core and club face within a mold; and
    injection molding a polymeric material between the mold and the core.

3. The method of claim 1, wherein the polymeric material on opposing sides of the flange provides a mechanical interference between the body and the club face to inhibit all relative translation between the club face and the body.

4. The method of claim 1, wherein removing the core from within the body forms one or more voids in the body; and
    further comprising affixing a metallic weight within each of the one or more voids.

5. The method of claim 1, further comprising fabricating the face from at least one of a stainless steel and a metal alloy including titanium.

6. The method of claim 1, wherein affixing the club fact to the core further includes inserting a locating pin extending from the club face into a hole provided in the core.

7. The method of claim 1, wherein the locating pin extends from a portion of the locking flange, and wherein molding the body about the core includes surrounding a portion of the locating pin with polymeric material.

8. The method of claim 1, wherein affixing the club face to the core further includes aligning a locating feature of the club head with a corresponding locating feature provided in the core.

9. A golf club head assembly comprising:
- a core formed from a first material and having a first melting temperature;
- a club face affixed to the core and including a first, hitting surface, a second surface that is opposite the first surface, and a flange that is separated from the second surface by a transverse distance that is greater than zero wherein a portion of the second surface of the club face is in flush contact with a surface of the core, and wherein the flange is spaced apart from the core;
- a polymeric body disposed about the core and on opposing sides of the flange, the polymeric body having a second melting temperature that is greater than the first melting temperature.

10. The assembly of claim 9, wherein the core is configured to be removed from the polymeric body by heating the core to a temperature between the first melting temperature and the second melting temperature.

11. The assembly of claim 9, wherein the flange is parallel to a portion of the first surface to within about +/−30 degrees.

12. The assembly of claim 9, wherein the polymeric body on opposing sides of the flange provides a mechanical interference between the body and the club face to inhibit all relative translation between the club face and the body.

13. The assembly of claim 9, further comprising a metallic weight disposed between the core and the polymeric body.

14. The assembly of claim 9, wherein a portion of the core contacts the second surface of the face; and
   wherein a portion of the body contacts the second surface of the face and surrounds the portion of the core that contacts the second surface of the face.

15. The assembly of claim 9, wherein the face includes at least one of a stainless steel and a metal alloy including titanium.

16. The assembly of claim 9, wherein the flange is a single, continuous flange that is aligned with a circumference of at least one of the first surface and the second surface.

17. The assembly of claim 9, wherein the body is formed entirely of a polymeric material.

18. The assembly of claim 9, wherein the club face further includes a locating pin that extends out from the club face into a hole provided in the core.

19. The assembly of claim 18, wherein the locating pin extends from a portion of the flange, and wherein the polymeric body surrounds a portion of the locating pin.

* * * * *